United States Patent
Park et al.

(10) Patent No.: US 8,446,880 B2
(45) Date of Patent: May 21, 2013

(54) METHOD OF PERFORMING CELL RE-SELECTION IN A WIRELESS COMMUNICATION SYSTEM

(75) Inventors: Sung Jun Park, Gyeonggi-do (KR);
Young Dae Lee, Gyeonggi-do (KR);
Seung June Yi, Gyeonggi-do (KR);
Sung Duck Chun, Gyeonggi-do (KR);
Seon Don Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 12/676,113

(22) PCT Filed: Sep. 22, 2008

(86) PCT No.: PCT/KR2008/005610
§ 371 (c)(1),
(2), (4) Date: Mar. 2, 2010

(87) PCT Pub. No.: WO2009/038420
PCT Pub. Date: Mar. 26, 2009

(65) Prior Publication Data
US 2010/0195618 A1  Aug. 5, 2010

(30) Foreign Application Priority Data
Sep. 21, 2007  (KR) .................. 10-2007-0096586

(51) Int. Cl.
*H04W 4/00* (2009.01)

(52) U.S. Cl.
USPC ............................. 370/332; 455/436

(58) Field of Classification Search
None
See application file for complete search history.

(56) References Cited

U.S. PATENT DOCUMENTS

| | | | |
|---|---|---|---|
| 5,712,793 A * | 1/1998 | Scepanovic et al. | 716/124 |
| 2004/0071231 A1 * | 4/2004 | Lin et al. | 375/341 |
| 2004/0196793 A1 * | 10/2004 | Lucidarme et al. | 370/252 |
| 2005/0128969 A1 * | 6/2005 | Lee et al. | 370/313 |
| 2007/0049325 A1 | 3/2007 | Lee | |
| 2007/0213061 A1 | 9/2007 | Kim | |
| 2008/0220784 A1 * | 9/2008 | Somasundaram et al. | 455/437 |

FOREIGN PATENT DOCUMENTS

KR          100715807        5/2007

* cited by examiner

*Primary Examiner* — Jianye Wu
(74) *Attorney, Agent, or Firm* — Lee, Hong, Degerman, Kang & Waimey

(57) ABSTRACT

A method of performing cell re-selection in a wireless communication system considering mobility of a user equipment comprises detecting cells having signal strength greater than a certain level for a first time interval and a second time interval, determining mobility of the user equipment using at least one of a change level in the number of cells detected for the first time interval and the second time interval and information related to variation of a signal characteristics value of at least one cell commonly detected for the first time interval and the second time interval, and performing cell re-selection considering mobility of the user equipment.

4 Claims, 8 Drawing Sheets

METHOD OF PERFORMING CELL RE-SELECTION IN A WIRELESS COMMUNICATION SYSTEM

CROSS-REFERENCE TO RELATED APPLICATIONS

This application is the National Stage filing under 35 U.S.C. §371 of International Application No. PCT/KR2008/005610, filed on Sep. 22, 2008, which claims the benefit of earlier filing date and right of priority to Korean Application No. 10-2007-0096586, filed on Sep. 21, 2007.

TECHNICAL FIELD

The present invention relates to a wireless communication system, and more particularly, to a method of performing cell re-selection in a wireless communication system.

BACKGROUND ART

In a wireless communication system, if a user equipment is initially powered on, the user equipment selects an initial cell in an idle mode. The idle mode means a state for receiving control information of a cell suitable to receive a service when the user equipment is initially powered on, and a standby state after communication. Basically, the user equipment selects the cell to register with a network so that it may receive a service from a base station. In this case, if strength or quality of a signal between the user equipment and the base station is deteriorated due to mobility of the user equipment, the user equipment performs re-selection of another cell to maintain transmission quality of data. Hereinafter, a feature of a physical signal related to signal strength or a signal to noise/interference ratio will be referred to as a signal feature.

FIG. 1 is a diagram illustrating an operation of a user equipment in an idle mode when the user equipment is initially powered on. If the user equipment is powered on, the user equipment automatically or non-automatically selects a public land mobile network (PLMN), which it desires to receive a service, and a radio access technology (hereinafter, referred to as "RAT") for communication (S400). The PLMN and RAT information may be selected by a user of the user equipment. Alternatively, the PLMN and RAT information previously stored in a universal subscriber identity module (USIM) may be used. Afterwards, the user equipment performs an initial cell selection procedure for selecting a cell having the largest value among cells having signal strength or quality between the user equipment and the base station, wherein the signal strength or quality is measured to be greater than a reference value (S410). The reference value means a value defined in the system to ensure quality of a physical signal during data transmission and reception. Accordingly, the reference value may depend on the applied RAT.

Afterwards, the user equipment receives system information (SI) periodically transmitted from the base station. The system information includes basic and indispensable information required for the user equipment to access the network. Also, the system information can include neighbor cell list (NCL) information which is information related to cells adjacent to a serving cell. Accordingly, the user equipment should receive system information before accessing the base station and always have the latest system information. If the user equipment is initially powered on, the user equipment selects a cell in an idle mode to receive the system information.

A detailed method for selecting a cell in a universal mobile telecommunication system (hereinafter, referred to as "UMTS"), which is a three-generation mobile communication system, will be described below. If the user equipment is initially powered on, the user equipment selects PLMN and RAT for radio communication and selects a cell having the strongest signal characteristics value among neighbor cells which satisfy the condition of Equation 1 through a signal measurement procedure with the base station in all frequency bands that can be detected by the user equipment during an initial cell selection procedure corresponding to step S410 of FIG. 1. In the existing WCDMA UMTS, a common pilot channel received signal code power (CPICH RSCP) corresponding to an average power after dispreading and combining of common pilot channels, a chip energy to noise ratio of a common pilot channel (CPICH Ec/N0), and carrier received signal strength indicator (carrier RSSI) are used as signal measurement target values.

Cell selection condition: Srxlev>0 AND Squal>0  [Equation 1]

wherein,

Squat=Qrxlevmeas−Qrxlevmin−Pcompensation

Meaning of each parameter is defined in Table 1.

TABLE 1

| Parameter | Description |
| --- | --- |
| Squal | Cell Selection quality value (dB) |
| Srxlev | Cell Selection RX level value (dB) |
| Qqualmeas | Measured cell quality value expressed in CPICH Ec/N0 (dB) |
| Qrxlevmeas | Measured cell CPICH RSCP RX level value (dBm). |
| Qqualmin | Minimum required quality level in the cell (dB) |
| Qrxlevmin | Minimum required RX level in the cell (dBm) |
| Pcompensation | RF dependent value (dB) |

As apparent from Equation 1 and Table 1, the user equipment selects a cell of which signal strength and quality are greater than specific values (strength: Qrxlevmin+Pcompensation, quality: Qqualmin) defined in the system. In this case, the values Qrxlevmin, Qqualmin, and Pcompensation are informed from the base station to the user equipment using system information. The user equipment is standby in an idle mode to request a network to provide a service (for example, originating call) or receive a service (for example, terminating call) from the network.

Afterwards, the user equipment registers its information such as international mobile subscriber identity (IMSI) with the network to receive a service (for example, paging) from the network (S420). Although the user equipment which is in an idle mode can receive control information such as system information from the cell, the user equipment is not in a radio resource control (RRC) connected state with UTRAN. Accordingly, since the network cannot identify exact information of the user equipment, the network uses IMSI used on a non-access stratum (NAS). The user equipment does not always register its information with the access network whenever selecting a cell. The user equipment registers its information with the network if network information which the user equipment knows is different from network information (for example, tracking area identity; TAI) included in system information.

If a strength or quality value of a signal measured from a base station which provides a service to the user equipment is lower than a value measured from a base station of a neighbor cell, the user equipment selects one of another neighbor cells which provide a better signal feature than that of the cell of the base station which the user equipment accesses (S430). This procedure will be referred to as a cell re-selection to be distinguished from the initial cell selection of step S410. The user equipment which is in an idle mode repeats the cell re-selection procedure of reselecting a cell having a better signal feature through signal measurement of a neighbor cell of a cell to which a service is currently provided. At this time, to prevent a cell from being frequently reselected in accordance with variation of the signal feature, there are provided temporal restrictions. Alternatively, since the user equipment does not need to perform cell re-selection if a signal characteristics value of a serving cell is greater than a reference value, the user equipment may not perform measurement.

FIG. 2 is a diagram illustrating a method of performing cell re-selection in a user equipment of an idle mode in the existing WCDMA UMTS. The reason why that the user equipment reselects a cell having a better signal feature is to improve service quality by minimizing error occurring during data transmission and reception between the user equipment and the base station. Accordingly, if signal strength or quality between the user equipment and the base station which is currently connected with the user equipment is deteriorated as the user equipment moves, it is necessary to reselect a cell having a better signal feature. However, if the user equipment reselects a cell, the user equipment needs additional operation such as reading-out operation of system information and registration operation with the network to receive a service in the selected cell. A problem occurs in that it is difficult for the user equipment to request a service (for example, RRC connection request) or receive a service (for example, paging) from the base station while the user equipment is performing the additional operation. Namely, delay of a service occurs.

Accordingly, if a signal feature is deteriorated, the user equipment reselects a cell having a better signal feature within a short time and at the same time prevents cell re-selection from being frequently performed to minimize a service delay that may occur. To this end, the user equipment sets minimum restriction time (Treselection) for cell re-selection to prevent a cell from being frequently selected. Also, a scaling factor is applied to the restriction time in accordance with mobility of the user equipment. Namely, if a moving speed of the user equipment is fast, the existing restriction time becomes short in response to fast cell change so that the user equipment quickly reselects a cell.

In more detail with reference to FIG. 2, the user equipment which is in an idle mode searches whether a signal characteristics value Rs of a serving cell and a signal characteristics value Rn with neighbor cells satisfy a condition defined in step S510. In other words, among cells which satisfy the condition of Equation 1, if the condition of Rn>Rs is satisfied for the restriction time Treselection* updated for cell re-selection, the user equipment selects a cell having the largest feature value through a ranking procedure which compares signal strength and quality among cells corresponding to Rn (S520). Namely, the user equipment selects a specific cell having the best signal feature among cells having a better signal feature than that of the serving cell. Rs and Rn are respectively determined through calculation procedures of Equation 2 and Equation 3.

$$Rs = Q_{meas,s} + Qhyst_s + Qoffmbms \quad \text{[Equation 2]}$$

$$Rn = Q_{meas,n} + Qoffset_{s,n} + Qoffmbms \quad \text{[Equation 3]}$$

In Equation 2 and Equation 3, $Q_{meas,s}$ means CPICH Ec/N0 value measured for a cell where the user equipment is currently receiving a service, and $Q_{meas,n}$ means CPICH Ec/N0 value measured for neighbor cells of the user equipment. $Qhyst_s$ is used so that the user equipment gives a weight value for the serving cell, $Qoffset_{s,n}$ is used so that the user equipment gives a bias between a cell where the user equipment is accessing and a cell where the user equipment desires to access, or Qoffmbms is used so that the user equipment gives a weight value for a cell which supports MBMS service.

The restriction time Treselection value is used to give time restriction prescribed to satisfy the condition (S510) of cell selection for a predetermined time or greater to prevent the user equipment from repeatedly selecting a specific cell. The Treselection value included in the system information and transmitted to the user equipment is corrected in accordance with the moving speed of the user equipment during the procedure of FIG. 3, so that the updated restriction time Treselection* is determined.

Hereinafter, the initial restriction time transmitted from the base station to the user equipment through the system information will be referred to as "Treselection", and the restriction time updated by applying a scaling factor determined in accordance with mobility of the user equipment to the initial restriction time through cell re-selection will be referred to as "Treselection*". The updated restriction time may be equal to the initial restriction time, or may be decreased or increased from the initial restriction time.

FIG. 3 is a diagram illustrating a method of determining mobility, i.e., moving speed of a user equipment for cell re-selection in the existing WCDMA UMTS.

After the user equipment reselects a cell (S600), the user equipment determines its current speed (S610). The moving speed of the user equipment is initially in an idle mode but is changed as the user equipment moves. The user equipment which is in an idle mode determines whether its moving speed is to be changed to fast speed in step S630. If the number of times of cells selected for a specific time $T_{CRmax}$ exceeds a predetermined value $N_{CR}$, the user equipment determines that its moving speed is fast (S640). If the number of times of cell reselection does not satisfy the condition $N_{CR}$ the user equipment determines that its moving speed is slow (S650). The user equipment continues to determine its moving speed and repeats the above procedure if it determines that its moving speed is still slow. In order to continue to determine that the moving speed of the user equipment is fast, the user equipment determines whether the condition of fast speed is satisfied for a predetermined time $T_{CRmaxHyst}$ (S620) even after determining that its moving speed is fast in step S610. If the condition of fast speed is satisfied, the user equipment maintains fast speed. If not so, the user equipment determines that its moving speed is slow (S650).

If the user equipment finally determines that its moving speed is fast (S640), the user equipment multiplies the value of the restriction time Treselection by a value between 0 and 1 received from the system information so as to update the restriction time which reflects the moving speed of the user equipment during cell re-selection. Namely, according to the related art, the user equipment determines that its moving speed is fast if a cell is frequently changed with another one, whereby the restriction time according to cell re-selection is reduced. As a result, the user equipment can more frequently perform cell re-selection and receive a service from a cell having a better signal feature.

Parameter values such as $T_{CRmax}$, $N_{CR}$, $T_{CRmaxHyst}$, Treselection, and scaling factor are included in the system information in step S410 of FIG. 1 and then transmitted to the user equipment. Table 2 illustrates an example of a range of the above values that can be transmitted from the base station in the UMTS according to the related art.

TABLE 2

| Parameter | Value type |
| --- | --- |
| TCRmax | Enumerated (not used, 30, 60, 120, 180, 240), second unit |
| NCR | Integer (1 . . . 16) |
| TCRmaxHyst | Enumerated (not used, 10, 20, 30, 40, 50, 60, 70), second unit |
| Treselection | Integer (0 . . . 31), second unit |
| Scaling Factor for Treselection | Real (0 . . . 1 by step of 0.1) |

As described above, in the method of determining a scaling factor in accordance with the related art, the moving speed of the user equipment is detected using the number of reselection times of cell for a specific time. However, such a related art has problems as follows. First of all, a problem occurs in that the related art does not consider an arrangement structure of a cell. Also, cell re-selection time becomes slow even though a change of signal feature is lowered to a specific value or less, or ping-pong situation may occur, in which specific several cells are repeatedly reselected.

FIG. 4 is a diagram illustrating an example of a procedure of reselecting a cell according to movement of a user equipment in the WCDMA UMTS.

The user equipment passes through a cell C, a cell B, and a cell D for an ongoing procedure from a cell A to a destination zone (zone X of FIG. 4). In this case, since the user equipment passes through several cells for a short time, it is determined that the moving speed of the user equipment is fast. If a scaling factor (for example, 0.5) is applied to the original restriction time Treselection (for example, 10 seconds), the updated restriction time becomes shorter than the original restriction time by half. The user equipment located in the destination zone (zone X) selects cell B, cell D or cell C as a candidate of a cell that can be reselected. Since the user equipment is located at the boundary of several cells and a measurement value of a radio wave measured by the user equipment has a fluctuation, the user equipment repeats re-selection of several cells even though it moves a little. Also, the user equipment more frequently performs cell re-selection due to the short restriction time. For this reason, a problem occurs in that service quality of the user equipment is deteriorated.

DISCLOSURE OF THE INVENTION

Accordingly, the present invention is directed to a method of performing cell re-selection in a wireless communication system, which substantially obviates one or more problems due to limitations and disadvantages of the related art.

An object of the present invention is to provide a method of performing cell re-selection in a wireless communication system, in which service quality can be enhanced.

Another object of the present invention is to provide a method of performing cell re-selection in a wireless communication system, in which cell re-selection is performing considering radio environmental variation such as an arrangement structure of a cell.

It is to be understood that the technical solutions to be achieved by the present invention will not be limited to the aforementioned description, and another technical solutions will be apparent to those skilled in the art to which the present invention pertains, from the following detailed description of the present invention.

A method of performing cell re-selection according to one aspect of the present invention is characterized in that a user equipment performs cell-reselection using at least one of a change level of signal characteristics values of at least one or more neighbor cells between at least two measurement timing points and a change level of the number of measured cells if the user equipment needs to perform cell re-selection.

The user equipment calculates variation of signal characteristics values of neighbor cells corresponding to measurement targets, and determines a scaling factor for updating cell re-selection restriction time using the calculated variation. In determining the scaling factor, a weight value according to a change level of the number of cells measured between two measurement timing points may be considered. The user equipment measures signal characteristics values of neighbor cells and a serving cell periodically or non-periodically if the signal characteristics value of the serving cell is smaller than a predetermined threshold value or even if the signal characteristics value of the serving cell is greater than the predetermined threshold value. In other words, the user equipment measures signal characteristics values of the serving cell and the neighbor cells if a predetermined event occurs or whenever a timer ends.

The user equipment can acquire information of cells corresponding to measurement targets using neighbor cell list (NCL) information received from a base station. Alternatively, the user equipment can select cells corresponding to measurement targets through scanning or synchronization without using NCL information. Meanwhile, the user equipment can select cells, which satisfy a previously determined minimum signal characteristics value among the selected cells, as measurement targets. Also, the user equipment can select another cells having different frequency bands and RAT as measurement targets. Herein, cells corresponding to measurement targets will be referred to as measurement cells.

The signal characteristics values measured for the measurement cells by the user equipment mean features of a physical signal, related to strength of a signal received from each measurement cell, a signal to noise ratio (SNR), a signal to interference ratio (SIR), and a signal to interference and noise ratio (SINR). Examples of the signal characteristics values include a reference symbol received power (RSRP) representing the receiving power of a bit pattern of a specific location of each slot of a subframe in an OFDM based system, a reference symbol received quality representing a ratio between RSRP and an interference signal, a received signal strength indicator (RSSI), a common pilot channel received signal code power (CPICH RSCP), a chip energy to noise ratio of a common pilot channel (CPICH Ec/N0), and a carrier received signal strength indicator (carrier RSSI). However, it is to be understood that the signal characteristics values will not be limited to the above examples.

In one aspect of the present invention, a method of performing cell re-selection in a wireless communication system considering mobility of a user equipment comprises detecting cells having signal strength greater than a certain level for a first time interval and a second time interval, determining mobility of the user equipment using at least one of a change level in the number of cells detected for the first time interval and the second time interval and information related to variation of a signal characteristics value of at least one cell commonly detected for the first time interval and the second time interval, and performing cell re-selection considering mobility of the user equipment.

In another aspect of the present invention, a method of performing cell re-selection in a user equipment of a wireless communication system comprises determining a restriction time value for cell re-selection using variation of a signal characteristics value of at least one cell detected for a first time interval and a second time interval, and performing cell re-selection using the restriction time value.

In other aspect of the present invention, a method of performing cell re-selection in a user equipment of a wireless communication system comprises determining a restriction time value for cell re-selection using variation of a signal characteristics value of at least one cell detected for at least two or more time intervals, and performing cell re-selection using the restriction time value.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram illustrating an operation of a user equipment in an idle mode when the user equipment is initially powered on;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an E-UMTS (Evolved Universal Mobile Telecommunications System). An E-UMTS is a system evolving from the conventional WCDMA (Wideband Code Division Multiple Access) UMTS and its basic standardization is currently handled by the 3GPP ($3^{rd}$ Generation Partnership Project). The E-UMTS can also be called an LTE (Long Term Evolution) system. Release 7 and Release 8 of 3GPP technical specifications ($3^{rd}$ Generation Partnership Project; Technical Specification Group Radio Access Network) can be referred to obtain detailed information of technical specification about the UMTS and the E-UMTS.

Figure 1:
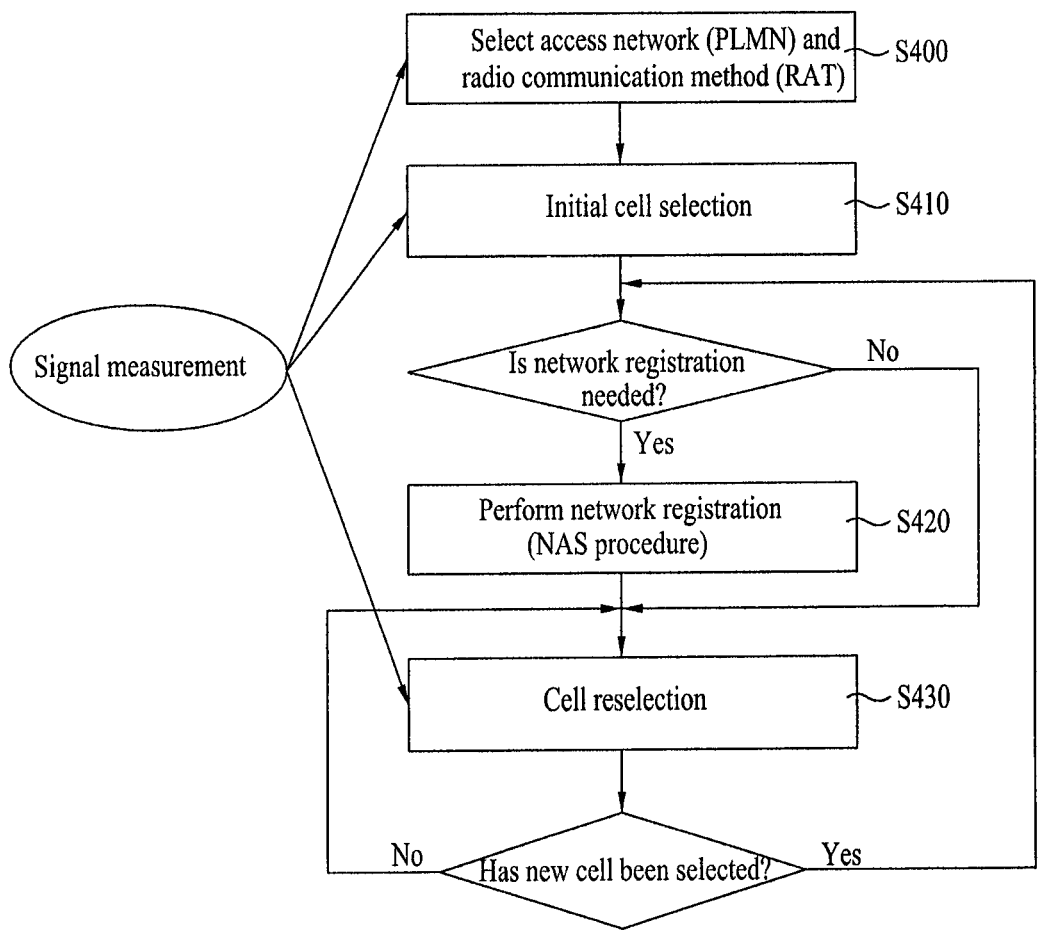
Figure 2:
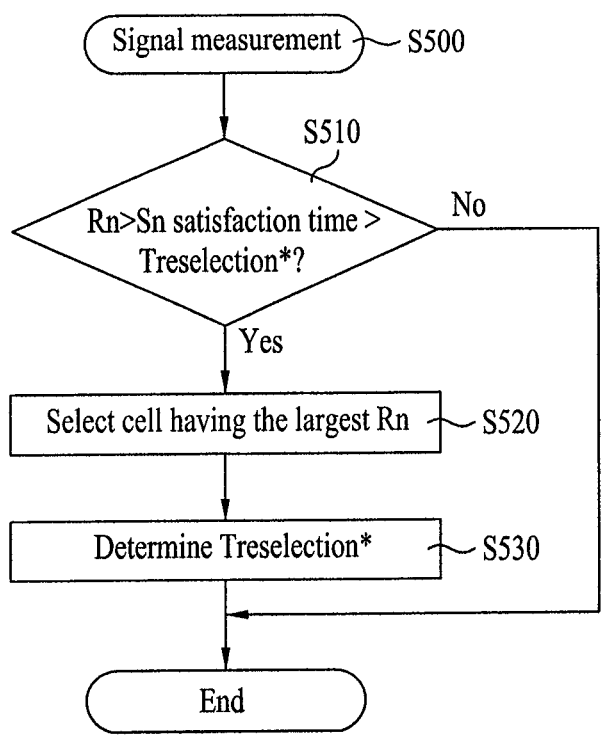
FIG. 2 is a diagram illustrating a method of performing cell re-selection in a user equipment of an idle mode in the existing WCDMA UMTS.
Figure 3:
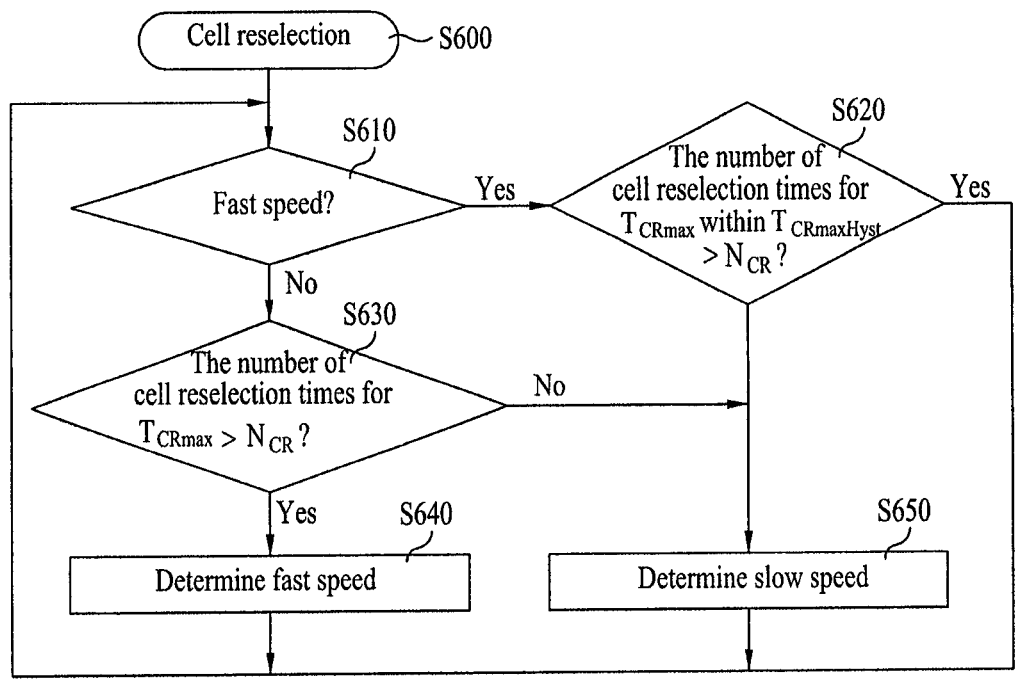
FIG. 3 is a diagram illustrating a method of determining moving speed of a user equipment for cell re-selection in the existing WDCMA UMTS.
Figure 4:
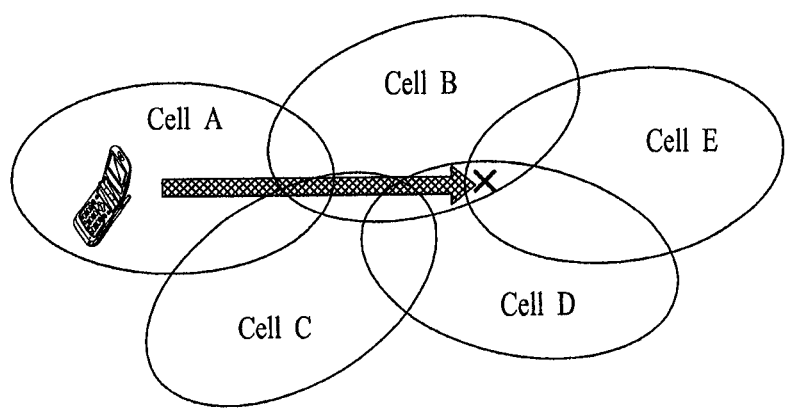
FIG. 4 is a diagram illustrating an example of a procedure of reselecting a cell according to movement of a user equipment in the WCDMA UMTS.
Figure 5:
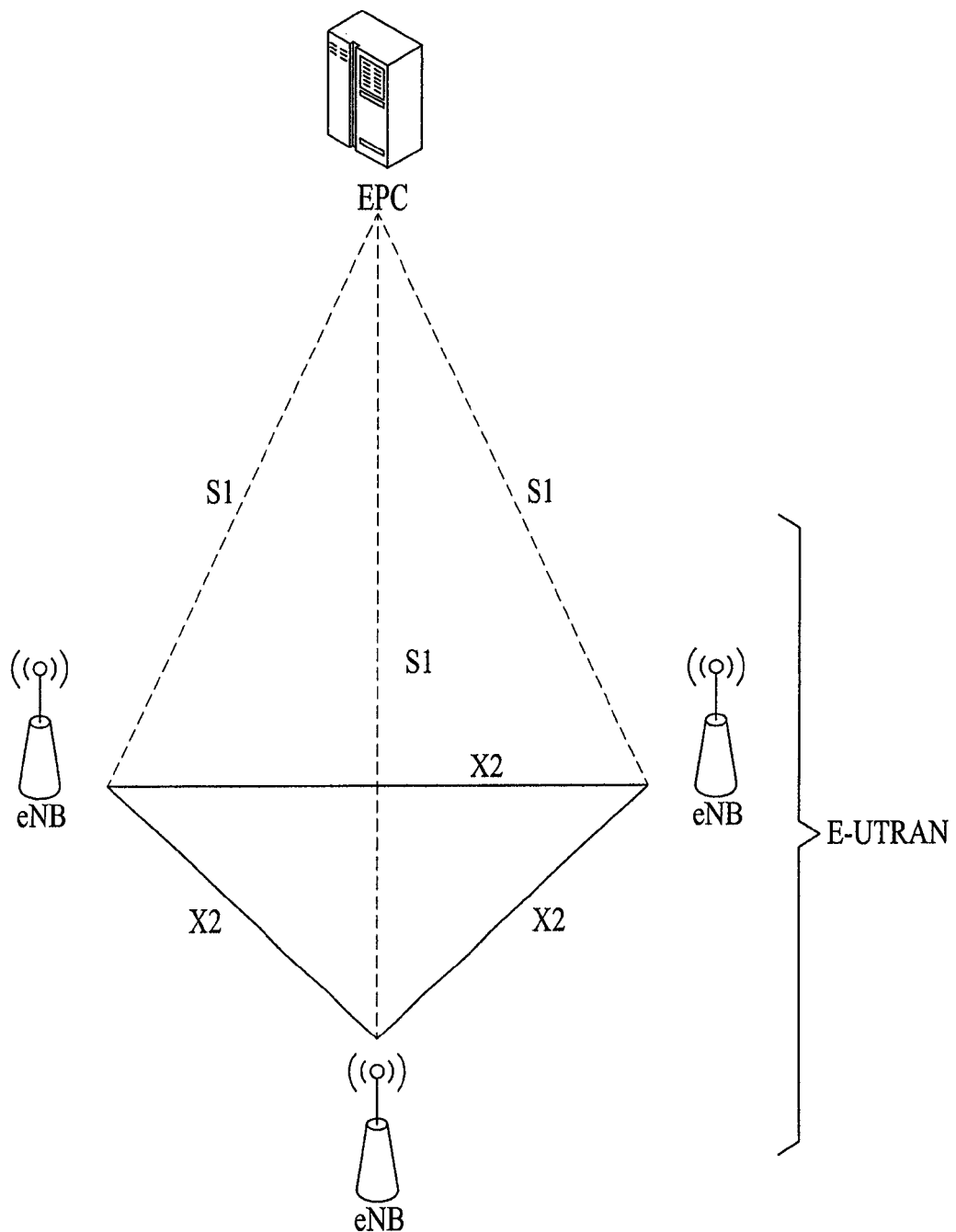
FIG. 5 is a diagram illustrating a network structure of an E-UMTS.

FIG. 5 is a diagram illustrating a network structure of the UMTS. Referring to FIG. 5, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the user equipment and the network. For this, the RRC layer enables RRC messages to be exchanged between the UE and the network. The RRC layer can be distributively located at network nodes including Node B, an AG and the like or can be independently located at either the Node B or the AG.

Figure 6:
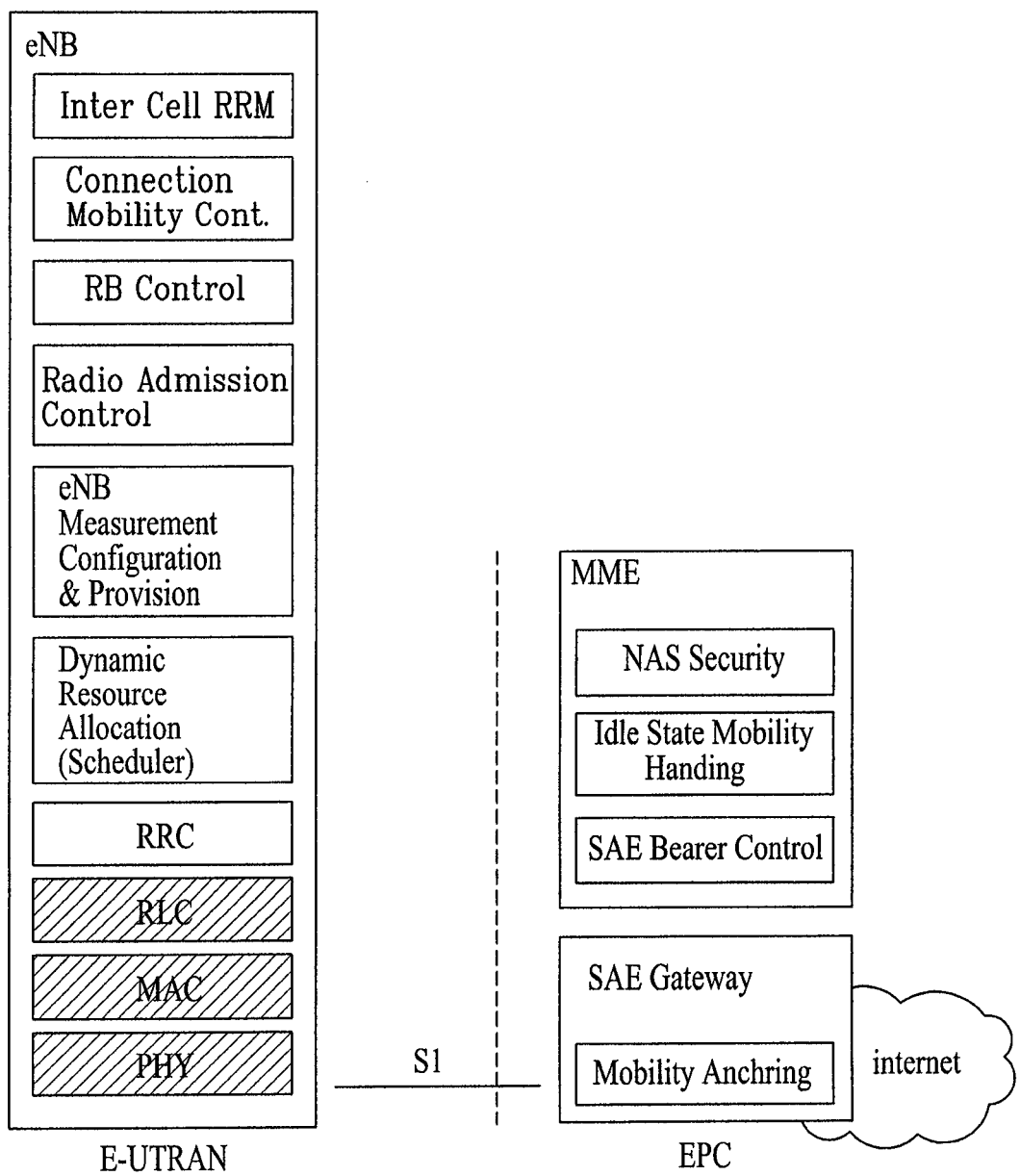
FIG. 6 is a schematic view illustrating an E-UTRAN (Evolved Universal Terrestrial Radio Access Network)

FIG. 6 is a schematic view illustrating an E-UTRAN (UMTS terrestrial radio access network). In FIG. 6, a hatching part represents functional entities of a user plane, and a non-hatching part represents functional entities of a control plane.

Figure 7A:
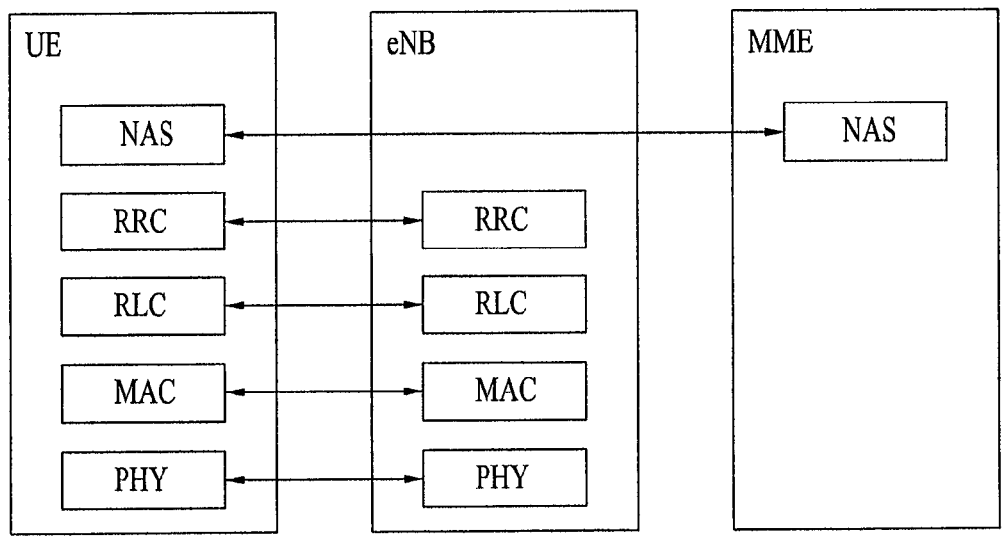
FIG. 7A is a schematic view illustrating a control plane protocol of a structure of a radio interface protocol between a user equipment (UE) and E-UTRAN.
Figure 7B:
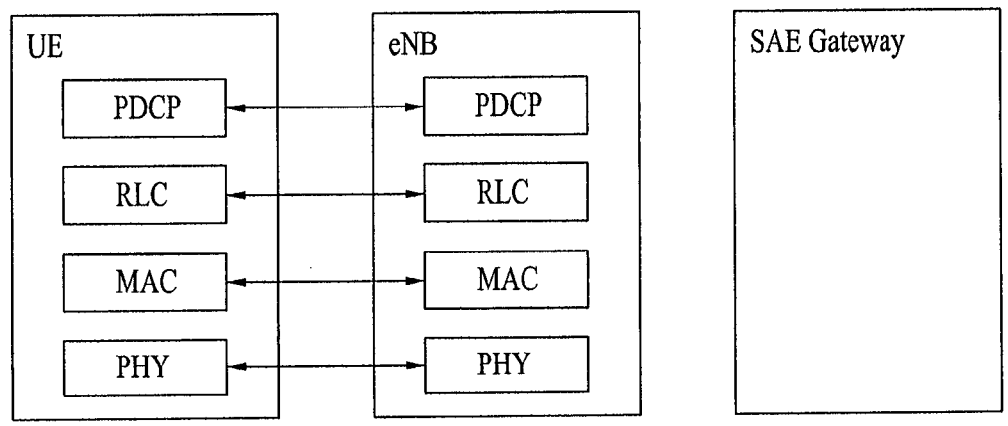
FIG. 7B is a schematic view illustrating a user plane protocol of a structure of a radio interface protocol between a user equipment (UE) and E-UTRAN.

FIG. 7A and FIG. 7B illustrate a structure of a radio interface protocol between the user equipment (UE) and the E-UTRAN, in which FIG. 7A is a schematic view of a control plane protocol and FIG. 7B is a schematic view of a user plane protocol. Referring to FIG. 7A and FIG. 7B, a radio interface protocol horizontally includes a physical layer, a data link layer, and a network layer, and vertically includes a user plane for data information transfer and a control plane for signaling transfer. The protocol layers in FIG. 7A and FIG. 7B can be classified into L1 (first layer), L2 (second layer), and L3 (third layer) based on three lower layers of the open system interconnection (OSI) standard model widely known in the communications systems.

The physical layer as the first layer provides an information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4 or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the user equipment and the UTRAN.

As downlink transport channels carrying data from the network to the user equipments, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from the user equipments to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

The base station eNB manages radio resources of one or more cells, each of which is established at any one of bandwidths of 1.25, 2.5, 5, 10, and 20 Mhz and provides downlink or uplink transfer service to several user equipments. At this time, different cells can be established to provide different bandwidths. The base station eNB notifies the user equipment of basic information for accessing the network using system information. Also, the base station may notify the user equipment of neighbor cell list (NCL) information of cells adjacent to a serving cell.

As described above, the system information (SI) includes indispensable information required for the user equipment to access the base station. Accordingly, the user equipment should receive system information before accessing the base station and always have the latest system information. Since the system information is information which all user equipments within one cell should know, the base station periodically transmits the system information. As described above, if the user equipment is powered on, the user equipment selects a cell in an idle mode to receive the system information and registers with the network. Also, the user equipment continues to identify whether a radio environment of a neighbor cell is better and performs cell re-selection if necessary.

Figure 8:
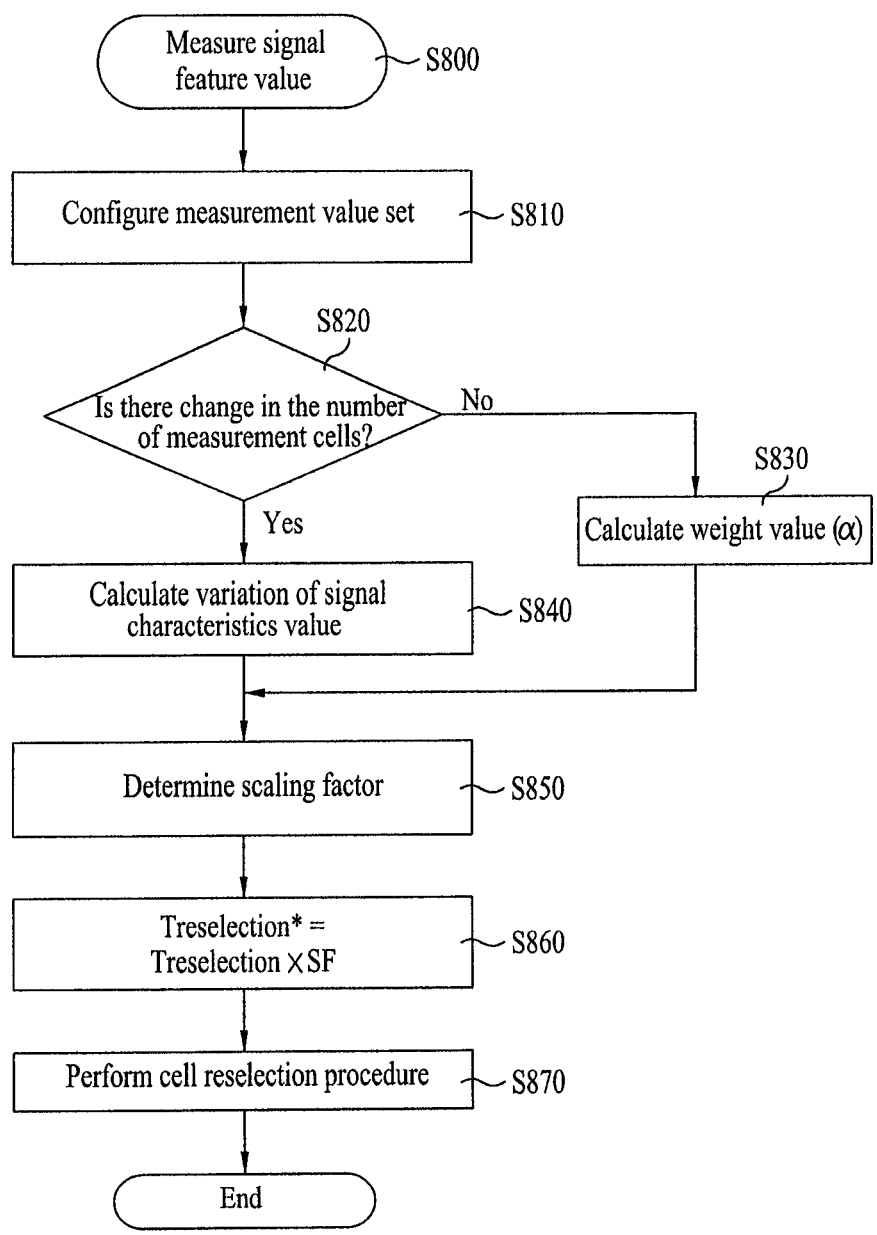
FIG. 8 is a flow chart illustrating a procedure according to one embodiment of the present invention.

FIG. 8 is a flow chart illustrating a procedure according to one embodiment of the present invention.

The user equipment has control information, which includes parameters to be used during cell re-selection. The control information may be defined in the system and thus may previously be stored in the user equipment and the base station. The control information may be received from the base station to be included in the system information. Also, the control information may be included in the RRC message received in a radio resource control (RRC) connected state.

The control information can include parameters as follows.

(1) Variation of Signal Characteristics Value and Scaling Factor Corresponding to Variation 1) Example 1: {0~40:1, 41~70:0.8, 71~90: 0.6, 91~100: 0.4, more than 100:0.2}

In the above example 1, if variation of a signal characteristics value such as RSRP is within the range of 0~40, for example, 1 is used as the scaling factor. If a variation of the signal characteristics value is within the range of 41~70, 0.8 is used as the scaling factor. If a variation of the signal characteristics value is within the range of 71~90, 0.6 is used as the scaling factor. If a variation of the signal characteristics value is within the range of 91~100, 0.4 is used as the scaling factor. If a variation of the signal characteristics value is beyond the range of 100, 0.2 is used as the scaling factor. In the example 1, a linear scaling factor is applied to a non-linear range of a variation of the signal characteristics value, and the range of values having small variation becomes wider considering radio environmental variation. Namely, as a variation of the signal characteristics value decreases by 40, 30, 20, and 10, the scaling factor linearly decreases by 0.2.

In the example 1, if the variation of the signal characteristics value is within the range of 0~40, it is determined that the moving speed of the user equipment is relatively slow, and 1 is used as the scaling factor so that the initial restriction time is maintained as it is. If the variation of the signal characteristics value is within the range of 91~100, since it is predicted that the moving speed of the user equipment is very fast, 0.4 is used as the scaling factor. Accordingly, if the initial restriction time is 10 seconds, 4 seconds become shorter so that fast cell re-selection can be performed.

2) Example 2: {0~50:1, 51~70:0.7, 71~90:0.4, more than 91:0.2}

The example 2 is similar to the example 1. However, unlike the example 1, the scaling factor is determined without a given rule in accordance with the range of the variation of each signal characteristics value.

3) Example 3: {high class: 0.2, normal class:0.5, low class: 1}

In the example 3, a variation is divided for each class, and the scaling factor is set for each class. In this case, the scaling factor is determined for each class fixedly transmitted with the system information, or the user equipment can determine the scaling factor by defining a class range through a mutual negotiation procedure between the user equipment and the base station. The case where the scaling factor is greater than 1 may be considered.

(2) Timer Used when Variation is Calculated and Reference Value

1) Signal characteristics value measurement timer and reference value: information related to a timer and reference value for measuring a timing point or a time period when a signal characteristics value of measurement cells is measured for calculation of variation of a signal characteristics value variation.

2) Variation update timer and reference value: information related to a timer and reference value for updating a variation of signal characteristics values measured and collected from measurement cells in order that the user equipment updates the restriction time.

3) Scaling factor update timer and reference value: information related to a timer and reference value for allowing the user equipment to update the scaling factor applied to update of the restriction time using variation obtained through 1) and 2).

(3) Weight Value to be Used when Variation is Calculated

1) Weight value defined by a user according to cell arrangement

2) Weight value for variation of the number of cells

3) Weight value according to specific frequency and radio technology

For example, in the case that the user equipment passes through a plurality of cells during cell re-selection, it may be regarded that the moving speed of the cells is faster than any other case. Accordingly, a weight value can be given in accordance with a variation of the number of cells. Meanwhile, when the scaling factor or the restriction time is updated, a weight value previously defined by a user in accordance with cell arrangement or a weight value according to a specific frequency or radio technology may be given.

The control information can include an initial restriction time (Treselection). Although one initial restriction time may be used, two or more initial restriction times may be set so that the user equipment may select one of the initial restriction times in accordance with its environment.

Referring to FIG. 8, the user equipment measures a signal characteristics value of measurement cells for a predetermined time interval periodically when a predetermined event occurs or whenever a timer expires [S800]. The user equipment configures measurement value sets comprised of signal characteristics values measured for at least two or more time intervals [S810]. For example, the user equipment can configure measurement value sets using signal characteristics values measured for two or more time intervals before a scaling factor update timer expires or their average values.

Table 3 illustrates an example of two measurement value sets.

TABLE 3

| First measurement value set | | Second measurement set | |
|---|---|---|---|
| Measurement cell | Signal characteristics value | Measurement cell | Signal characteristics value |
| A | −110 dBm | A | −130 dBm |
| B | −120 dBm | B | −190 dBm |
| C | −140 dBm | C | −130 dBm |

In Table 3, the first measurement value set includes signal characteristics values measured for three measurement cells A, B and C for the first time interval, and the second measurement value set includes signal characteristics values measured for the same measurement cells for the second time interval.

The user equipment determines whether there is any change in the number of measurement cells for two time intervals [S820]. Among the measurement value sets, a specific measurement cell may exist in one of the measurement value sets but may not exist in another one. Namely, a measurement cell may newly occur or may be removed due to movement of the user equipment. If there is any change in the number of measurement cells, a weight value according to such a change level is determined [S830]. An example of determining a change level in the number of measurement cells includes a method of subtracting the number of commonly detected cells from a total sum of the number of cells measured for the first time interval and the second time interval. If there is a larger change in the number of measurement cells, a larger weight value is set. If there is a smaller change in the number of measurement cells, a smaller weight value is set.

The user equipment calculates a variation of a signal characteristics value using measurement value sets configured in step S810 [S840]. A method of calculating the variation of the signal characteristics value can consider the following ways. First, a statistical value, such as a sum, average, standard deviation or dispersion of signal characteristics values included in each measurement value set, can be calculated to obtain a difference value and then the difference value can be used as the variation of the signal characteristics value. Second, a statistical value, such as a sum, average, standard deviation or dispersion of signal characteristics values of each measurement cell commonly included in measurement value sets, can be used as the variation of the signal characteristics value. In addition, it will be apparent to those skilled in the art that the variation of the signal characteristics value can be calculated by various methods.

If the variation of the signal characteristics value is calculated, the user equipment obtains a variation of a final signal characteristics value by reflecting the weight value calculated in step S830 and determines a scaling factor corresponding to the final variation [S850]. The determined scaling factor may be a fixed value or may be adjusted properly in accordance with environmental change due to movement of the user equipment, etc.

If the scaling factor is determined, the user equipment obtains the updated restriction time (Treselection*) by multiplying the initial restriction time (Treselection) by the determined scaling factor [S860] (i.e., Treselection*=Treselection X scaling factor). The user equipment performs the cell re-selection procedure using the updated restriction time (Treselection*) [S870].

Meanwhile, it is noted from Equation 2 or Equation 3 that a value such as $Qoffset_{s,n}$ or $Qhyst_s$ gives a weight value to the measurement value of the user equipment and thus can affect the cell re-selection time. Also, even in the case that the signal characteristics value of the serving cell is defined by a predetermined reference value (Ssearch) at the time when the cell starts to be searched, like the WCDMA based UMTS, i.e., even in the case that the user equipment starts to perform measurement to search a cell for the purpose of cell re-selection as the signal characteristics value of the serving cell decreases to a value less than Ssearch, the size of the signal characteristics value affects the cell re-selection time. Accordingly, the determined scaling factor can be applied to the above values so as to adjust the cell re-selection time.

Although the embodiment of the present invention may be used independently, it may be used in combination with the related art. For example, in a state that the number of cell re-selection times satisfies a certain condition within a specific time, the method of determining a scaling factor using a variation of a signal characteristics value of a measurement cell according to the embodiment of the present invention can be used.

Meanwhile, to calculate the variation, a weight value may be given to change in the number of measurement cells or the state that variation is not changed for a predetermined time interval. The scaling factor suggested in the embodiment of the present invention may be greater than 1 considering that the weight value is given at a value greater than 0.

Figure 9:
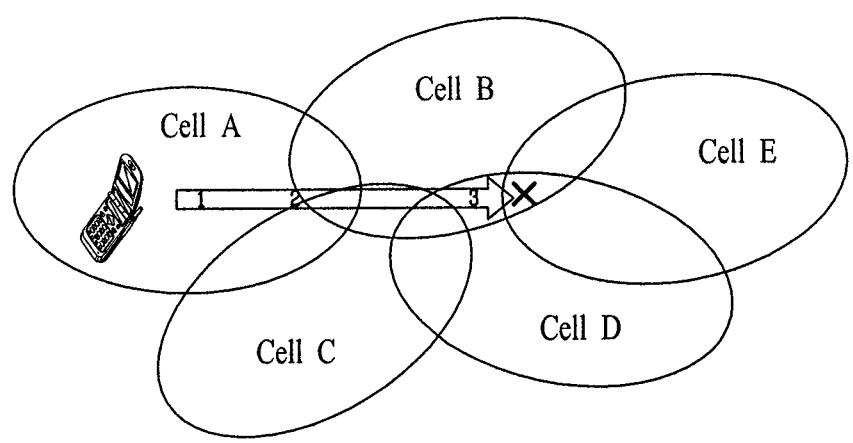
FIG. 9 is a diagram illustrating one embodiment according to the present invention.

FIG. 9 is a diagram illustrating the embodiment of the present invention. The embodiment according to FIG. 9 will be described under the following assumption.

1) All signal characteristics values measured by the user equipment are regarded as reference symbol received power (RSRP) values of dBm unit.

2) The base station is located at the center of each cell, and a signal characteristics value received by the user equipment is lowered as the distance between the base station and the user equipment gets away. A high signal characteristics value of −60 dbm is obtained at the center of the base station.

3) System Information
scaling factor for variation of RSRP signal characteristics value {0~50:1, 51~70:0.7, 71~90:0.4, more than 91:0.2}
initial restriction time (Treselection): 10 seconds
signal characteristics value (Ssearch) of a service cell which starts measurement of a measurement cell: −100 dbm
measurement period of variation of measurement cell: 20 seconds minimum signal characteristics value for selecting cell: −180 dbm Meanwhile, the method of obtaining a scaling factor in the user equipment and rules of defining update time will be described as follows.

1) A variation is obtained by an average of difference values of a signal characteristics value (RSRP of dBm unit) for cells having one cell identifier among measurement cells. Namely, the variation of the signal characteristics value is calculated for measurement cells commonly selected at two measurement times.

2) Cells having no cell identifier among measurement cells are excluded from calculation of the variation, and are calculated as a weight value of an average value of a final measurement cell. Namely, if a measurement cell is recorded at only one of both measurement times, it is determined that cell re-selection should frequently be performed due to fast movement of the user equipment. Accordingly, in this embodiment, a weight value of 0.1 is given. However, if a signal characteristics value of a cell having identifier is less than a signal characteristics value (for example, −180 dbm) defined in the system, a weight value is not given to the corresponding cell. For reference, the user equipment can identify cells using information such as reference signal, code, frequency, bandwidth, and radio access technology.

3) The scaling factor is updated using the calculated variation and system information.

Hereinafter, the method of performing cell re-selection according to location of the user equipment in FIG. 9 will be described.

(1) The Case where the User Equipment is Located in No. 1 Location

If the user equipment is located in the No. 1 location, since a signal characteristics value (−60 dbm) of a serving cell A is greater than the feature value (Ssearch:−100 dbm), the user equipment does not perform measurement.

(2) The Case where the User Equipment is Located in No. 2 Location

As the signal characteristics value of the serving cell A decreases to a value less than Ssearch (−100 dbm) while the user equipment is moving from the No. 1 location to a destination through the No. 2 location, the user equipment starts to perform measurement. Table 4 illustrates two measurement value sets comprised of signal characteristics values of measurement cells measured for two time intervals before and after a measurement period (20 seconds) of variations of signal characteristics values of measurement cells.

TABLE 4

| First measurement value set | | Second measurement value set | |
|---|---|---|---|
| Measurement cell | Signal characteristics value | Measurement cell | Signal characteristics value |
| A | −110 dBm | A | −130 dBm |
| B | Not detected | B | −190 dBm |
| C | −140 dBm | C | −130 dBm |

In accordance with the above rules, the variation of cell A is 20. Since cell B does not satisfy the minimum signal characteristics value defined in the system, cell B is excluded from calculation of the variation. Also, the variation of cell C is 10. Accordingly, an average variation of cell A and cell C is 15. Since the scaling factor corresponding to a variation 15 is 1 in the system information, update of the restriction time is not performed.

(3) The Case where the User Equipment is Located in No. 3 Location

The user equipment is moving from the No. 2 location to the destination through the No. 3 location, and the current serving cell is C. Since the signal characteristics value of the serving cell C is less than Ssearch (−100 dbm), the user equipment continues to perform measurement. Table 5 illustrates two measurement value sets comprised of signal characteristics values of measurement cells measured for two time intervals before and after a measurement period (20 seconds) of variation of signal characteristics values of measurement cells.

TABLE 5

| First measurement value set | | Second measurement set value | |
|---|---|---|---|
| Measurement cell | Signal characteristics value | Measurement cell | Signal characteristics value |
| A | −170 dBm | A | Not detected |
| B | −160 dBm | B | −120 dBm |
| C | −130 dBm | C | −180 dBm |
| D | Not detected | D | −150 dBm |

In accordance with the above rules, since cell A and cell D have not been detected, the cells A and B are excluded from calculation of the variation. Also, since the variation of cell B is 40 and the variation of cell C is 50, an average variation of the cells is 45. Since the variation in the number of cells is 2, a weight value of 0.2 is given so that a final average variation value is 45×1.2=54 and a scaling factor of 0.7 is obtained. As a result, the updated restriction time (Treselection*) used during cell re-selection becomes 7 seconds (=10×0.7). Namely, it is noted that the restriction time of cell re-selection decreases to change a cell faster in accordance with radio environmental change.

(4) The Case where the User Equipment Arrives in the Destination Zone

It is assumed that the user equipment has arrived in the destination ('X' in FIG. 9) and the current serving cell is D. It is also assumed that the user equipment roams near the destination without any great movement. Since the signal characteristics value of the serving cell D is less than Ssearch (−100 dbm), the user equipment performs measurement to search a cell having good signal feature. Table 6 illustrates two measurement value sets comprised of signal characteristics values of measurement cells measured for two time intervals before and after a measurement period (20 seconds) of variation of signal characteristics values of measurement cells.

TABLE 6

| First measurement value set | | Second measurement value set | |
|---|---|---|---|
| Measurement cell | Signal characteristics value | Measurement cell | Signal characteristics value |
| B | −140 dBm | B | −150 dBm |
| D | −130 dBm | D | −135 dBm |
| E | −160 dBm | E | −170 dBm |

In accordance with the above rules, since the variation of cell B is 10, the variation of cell D is 5, and the variation of cell E is 10, an average variation of the cells is about 8. Since a scaling factor corresponding to the variation 8 is 1 in the system information, the size of the updated restriction time (Treselection*) is the same as the initial restriction time (Treselection). In this case, if a weight value is given to a small variation obtained for the number of specific times or a specific period, a restriction time longer than 10 seconds can be obtained. If the user equipment is located near the boundary of cells, the restriction time is maintained constantly or increases if a radio status is not changed. Accordingly, it is possible to prevent ping-pong situation from being generated, wherein the ping-pong situation means that several cells are repeatedly selected in accordance with small movement of the user equipment or change of a radio environment.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention can be used in a wireless communication system such as a mobile communication system or a wireless Internet system.

The invention claimed is:

1. A method of performing cell re-selection at a user equipment in a wireless communication system, the method comprising:
    measuring a signal characteristics value of at least one cell among a number of cells detected in a first time interval and in a second time interval, respectively;
    calculating a variation of the signal characteristics value of the at least one common cell, wherein the at least one common cell is commonly detected by the user equipment in both of the first time interval and the second time interval;
    giving a weight value to the variation of the signal characteristics value according to a change level in the number of cells detected in the first time interval and the second time interval, wherein the change level in the number of cells is a value obtained by subtracting the number of the at least one common cell from a total sum of the at least one cell among the number of cells;
    determining a scaling factor (SF) corresponding to the value of the given weight value;
    determining an updated restriction time by multiplying a previous restriction time by the determined SF; and
    performing a cell re-selection procedure according to the updated restriction time.

2. The method of claim 1, wherein the variation of the signal characteristics value is calculated using one of a sum, average, standard deviation, or dispersion of the signal characteristics value, respectively, in the first time interval and in the second time interval.

3. The method of claim 1, wherein the variation of the signal characteristics value is calculated for a cell having a signal strength greater than a predetermined level.

4. The method of claim 1, wherein the signal characteristics value is one of a reference symbol received power (RSRP), reference symbol received quality (RSRQ), received signal strength indicator (RSSI), a common pilot channel received signal code power (CPICH RSCP), a chip energy to noise ratio of a common pilot channel (CPICH Ec/NO), or a carrier received signal strength indicator (carrier RSSI).

* * * * *